(12) United States Patent
Malone, Sr.

(10) Patent No.: US 7,023,633 B2
(45) Date of Patent: Apr. 4, 2006

(54) ADAPTIVE TRACK COUNT DETERMINATION FOR A SELF-SERVOWRITTEN DISK DRIVE

(75) Inventor: Daniel James Malone, Sr., San Jose, CA (US)

(73) Assignee: Hitachi Global Storage Technologies Netherland B.V., Amsterdam (NL)

( * ) Notice: Subject to any disclaimer, the term of this patent is extended or adjusted under 35 U.S.C. 154(b) by 41 days.

(21) Appl. No.: 10/355,474

(22) Filed: Jan. 31, 2003

(65) Prior Publication Data

US 2004/0150903 A1    Aug. 5, 2004

(51) Int. Cl.
G11B 27/36    (2006.01)
G11B 21/02    (2006.01)
G11B 5/596    (2006.01)

(52) U.S. Cl. .................. 360/31; 360/75; 360/77.08
(58) Field of Classification Search ............... 360/31, 360/46, 53, 75
See application file for complete search history.

(56) References Cited

U.S. PATENT DOCUMENTS

| | | | |
|---|---|---|---|
| 5,430,581 A | 7/1995 | Moribe et al. | 360/31 |
| 5,537,264 A | 7/1996 | Pinteric | 360/31 |
| 5,596,458 A | 1/1997 | Emo et al. | 360/48 |
| 5,949,603 A | 9/1999 | Brown et al. | 360/75 |
| 6,091,559 A * | 7/2000 | Emo et al. | 360/48 |
| 6,310,740 B1 | 10/2001 | Dunbar et al. | 360/46 |
| 6,317,285 B1 | 11/2001 | Bi et al. | 360/75 |
| 6,751,042 B1 * | 6/2004 | Bi et al. | 360/75 |
| 6,779,249 B1 * | 8/2004 | Santini | 360/119 |

* cited by examiner

Primary Examiner—David Hudspeth
Assistant Examiner—Glenda P. Rodriguez
(74) Attorney, Agent, or Firm—Zilka-Kotab, PC

(57) ABSTRACT

A system and process for constructing a magnetic storage drive capable of single pass self-servowriting. A plurality of heads are sorted, or "binned," into classifications based on at least an approximate magnetic width of each head. Only heads from a single classification are installed in a particular disk drive system. A track overlap value is calculated, preferably empirically, for the approximate magnetic widths of typical heads in the single classification. The overlap value is used to determine a track spacing utilized during a self-servowriting process.

17 Claims, 7 Drawing Sheets

ADAPTIVE TRACK COUNT DETERMINATION FOR A SELF-SERVOWRITTEN DISK DRIVE

FIELD OF THE INVENTION

The present invention relates to self-servowrite processes, and more particularly, this invention relates to one pass self-servowrite processes to achieve a desired number of tracks given the head width variation and mechanisms implementing such processes.

BACKGROUND OF THE INVENTION

A typical disk drive storage system includes one or more magnetic disks which are mounted for co-rotation on a hub or spindle. A typical disk drive also includes a transducer supported by a hydrodynamic bearing which flies above each magnetic disk. The transducer and the hydrodynamic bearing are sometimes collectively referred to as a data head or a product head. A drive controller is conventionally used for controlling the disk drive based on commands received from a host system. The drive controller controls the disk drive to retrieve information from the magnetic disks and to store information on the magnetic disks. An electromechanical actuator operates within a negative feedback, closed-loop servo system to move the data head radially or linearly over the disk surface for track seek operations and holds the transducer directly above a desired track or cylinder on the disk surface for track following operations.

Typically the magnetic disks 2 also comprise servo sectors 18 which are recorded at a regular interval and interleaved with the data sectors 12, as shown in FIG. 1. A servo sector, as shown in FIG. 2, typically comprises a preamble 20 and sync mark 22 for synchronizing to the servo sector; a servo data field 24 comprising coarse position information, such as a Gray coded track address, used to determine the radial location of the head with respect to the plurality of tracks; and a plurality of servo bursts 26 recorded at precise intervals and offsets from the track centerlines which provide fine head position information. When writing or reading data, a servo controller performs a "seek" operation to position the head over a desired track; as the head traverses radially over the recording surface, the Gray coded track addresses in the servo data field 24 provide coarse position information for the head with respect to the current and target track. When the head reaches the target track, the servo controller performs a tracking operation wherein the servo bursts 26 provide fine position information used to maintain the head over the centerline of the track as the digital data is being written to or read from the recording surface.

Often, the servo information used by the servo system is prerecorded on the disk surfaces during manufacture of the disk drive module using a process sometimes referred to as servo writing. In a typical prior art process, each disk drive module is mounted to a servo writer support assembly which precisely locates the disk surfaces relative to a reference or origin. The servo writer support assembly supports a position sensor such as laser light interferometer (for detecting the position of the actuator which locates the heads that perform servo track writing), and a push pin, driven by a servo writer voice coil, which positions the actuator itself. The position sensor is electrically inserted within the disk drive's negative feedback, closed-loop servo system for providing position information to the servo system while the servo data is being written to the disk surfaces. The servo writer support assembly may also support a clock writer transducer which writes a clock pattern onto the disk surface which is used for temporally spacing the servo data about the circumference of each track. A cleanroom is required during the servo writing process as the hard drive assembly needs to be unsealed to allow the clock head, push pin and laser to access the actuator and disk. This is to prevent particle contamination during servo writing. Servo track writers and cleanroom processes are very costly.

Another technique for writing servo information uses the disk drive itself to write the servo information in situ. In situ recording means that the servo patterns are recorded on a fully assembled drive using the product head. This process is also referred to as self-servowriting. In the self-servowrite process, the product actuator is used to make the steps and the position steps are bootstrapped off the magnetic width of the head. The spacing between tracks and thus the number of tracks per inch is a function of the head width itself. Wide heads produce larger track spacings and narrow heads produce smaller track spacings. With a fixed mechanical distance from the inner diameter (ID) to the outer diameter (OD) on a disk drive, the wider track spacings produce less tracks and the narrower tracks spacings result in more tracks. One may produce fewer tracks than is required for the product format. The other may produce far more than required and make the areal density too stressful.

On most drive programs that use the self-servowrite process, a two pass process is used to obtain the correct number of tracks for the desired format. In that process, the first pass is run to get the track counts for the given disk real estate. Once that is done, the drive is again servowritten, this time using a different relative spacing to achieve the desired track counts. Use of a two pass process obviously doubles the test time and the number of servowriters required for a particular program.

What is needed is a one pass self-servowrite process capable of achieving the desired track counts on the disk drive to reduce test time and number of servowriters. Additionally, use of a self-servowrite process is more desirable as the drive does not need to be open and therefore can be run outside of the clean room, using less expensive factory space. It also saves the conventional servo track writer cost.

SUMMARY OF THE INVENTION

The present invention solves the problems described above by providing a system and process for constructing a magnetic storage drive capable of single pass self-servowriting. A plurality of heads are sorted, or "binned," into classifications based on at least an approximate magnetic width of each head. Only heads from a single classification are installed in a particular disk drive system. A track overlap value is calculated, preferably empirically, for the approximate magnetic widths of typical heads in the single classification. The overlap value is used to determine a track spacing utilized during a self-servowriting process. In particular, the track overlap values are used to affect the track pitches applied to the drive system.

According to another embodiment, a system and process for selecting desired average estimated overlaps for different sizes of heads is provided. In this embodiment, at least an approximate magnetic width of at least some of a plurality of heads is determined. The heads are sorted into classifications based on the magnetic widths. A track overlap value is selected for each classification based on the approximate magnetic widths of the heads in each classification and the resultant track counts obtained after the self-servowrite process is completed.

A magnetic storage system capable of single pass self-servowriting includes magnetic media and at least one head for reading from and writing to the magnetic media. Each head has been sorted into a classification based on at least an approximate magnetic width of each head. A track overlap value for the classification has been selected based on the approximate magnetic width of each head in the classification, wherein the overlap value is used to determine a track spacing during a self-servowriting process. A slider supports each head. A control unit is coupled to each head for controlling operation of each head.

In any of the embodiments above, the overlap value(s) can be calculated from the equation:

$$OL=((Tr/TP+Tw/TP)-1)/(Tr/TP)$$

where:
OL=overlap value.
Tr=amplitude obtained by a read head.
Tw=amplitude of one of a bursts. and
TP=total amplitude of a cylinder.

The overlap value(s) can also be calculated by writing a servoburst on a given track of a disk, writing a second servoburst on a second track of the disk, centering a read head over a gap between the two servobursts, reading magnitudes of the two servobursts using the read head, adding the magnitudes of the two servobursts, and dividing a sum of the servoburst magnitudes by an amplitude obtained by centering the read head over one of the servobursts and taking a reading.

The approximate magnetic widths of the heads can be determined by testing the heads. The approximate magnetic widths of the heads can also be determined from measurements of a wafer on which the heads have been formed.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
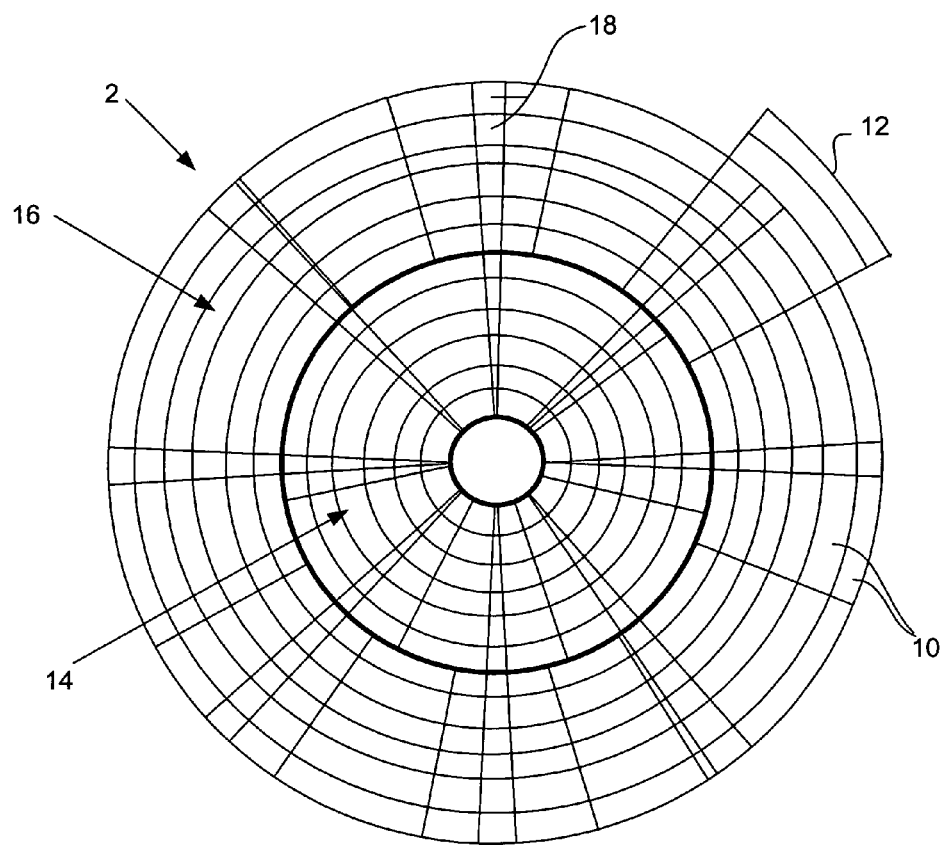
FIG. 1 shows a typical format for of a disk surface comprising a plurality of radially spaced, concentric data tracks partitioned into a number of data sectors and embedded servo sectors for positioning the heads over the disk surfaces while seeking and tracking.
Figure 2:
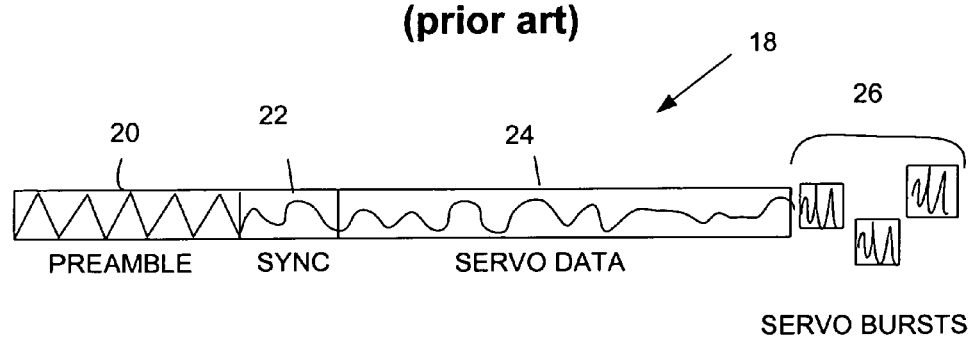
FIG. 2 shows a typical format of an embedded servo sector.
Figure 3:
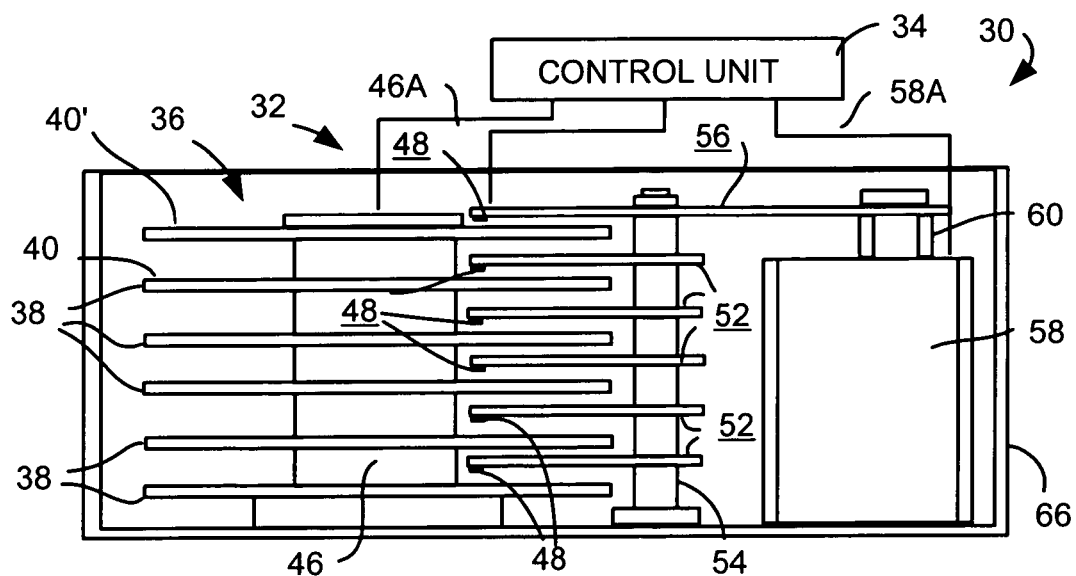
FIG. 3 is a schematic and simplified vertical sectional view of a rigid magnetic disk drive unit embodying the present invention.

Referring now to the drawings wherein like reference numerals designate like or similar parts throughout the several views there is illustrated in FIG. 3 a cross-sectional diagram of parts of a data storage disk drive system 30 including a rigid magnetic disk drive unit generally designated as 32 and a control unit generally designated as 34. While a magnetic disk drive unit is illustrated, it should be understood that other mechanically moving memory configurations may be used. Unit 32 is illustrated in simplified form sufficient for an understanding of the present invention because the utility of the present invention is not limited to the details of a particular drive unit construction. After data storage disk drive system 30 is completely assembled, servo information used to write and read data is written using the disk drive system 30.

Figure 4:
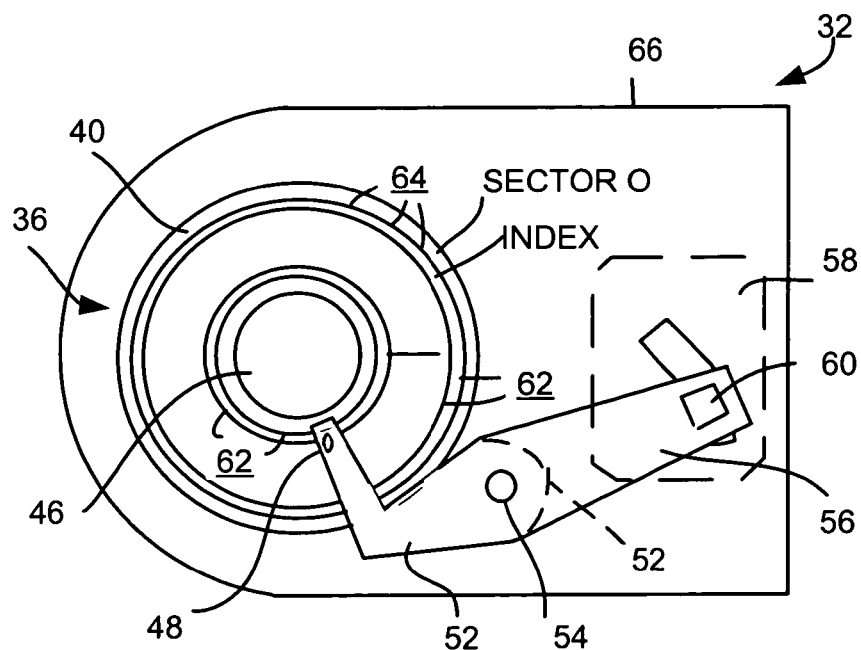
FIG. 4 is a top plan view of the structure shown in FIG. 3.

Referring now to FIGS. 3 and 4 of the drawing, disk drive unit 32 includes a stack 36 of disks 38 having at least one magnetic surface 40. The disks 38 are mounted in parallel for simultaneous rotation on and by an integrated spindle and motor assembly 46. Data information on each disk 38 are read and/or written to by a corresponding transducer head 48 movable across the disk surface 40. In a disk drive using a dedicated or hybrid servo, one of the disk surfaces 40' stores servo information used to locate information and data on the other disk surfaces 40.

Transducer heads 48 are mounted on flexure springs 50 carried by arms 52 ganged together for simultaneous pivotal movement about a support spindle 54. One of the arms 52 includes an extension 56 driven in a pivotal motion by a head drive motor 58. Although several drive arrangements are commonly used, the motor 58 can include a voice coil motor 60 cooperating with a magnet and core assembly (not seen) operatively controlled for moving the transducer heads 48 in synchronism in a radial direction in order to position the heads in registration with data information tracks or data cylinders 62 to be followed and access particular data sectors 64. Although a rotary actuator is shown, it should be understood that a disk drive with a linear actuator can be used. Data storage disk drive system 30 is a modular unit including a housing 66. The various components of the disk drive system 30 are controlled in operation by signals generated by control unit 34 such as motor control signals on line 46A and position control signals on line 58A.

Numerous data information tracks 62 are arrayed in a concentric pattern in the magnetic medium of each disk surface 40 of data disks 38. A data cylinder includes a set of corresponding data information tracks 62 for the data surfaces 40 in the data storage disk drive system 30. Data information tracks 62 include a plurality of segments or data sectors 64 each for containing a predefined size of individual groups of data records which are saved for later retrieval and updates. The data information tracks 62 are disposed at predetermined positions relative to servo information, such as a servo reference index. In FIG. 4 one sector 64 is illustrated as SECTOR O with a fixed index or mark INDEX for properly locating the first data sector. The location of each next sector 64 is identified by a sector identification (SID) pulse read by transducer heads 48 from surfaces 40, 40'.

Due to head tolerances, the number of tracks written during self-servowriting varies significantly. As mentioned above, a self-servowrite process produces significant variances in track counts, as the spacing between tracks and thus the number of tracks per inch is a function of the head width itself. The prior art requires two passes to perform self-servowriting: one pass to calibrate, and a second pass written with about the correct number of tracks.

The various embodiments of the present invention provide a self-servowrite process that achieves the desired track counts on the disk drive in only a single pass. More particularly, this invention provides processes for adaptively affecting the number of tracks written to achieve the desired format. The processes utilize send-ahead information about the probable magnetic widths of the heads to modify the track overlaps as appropriate for each drive. This provides flexibility to deal with varying head magnetic track widths. Servowrite test time is reduced by use of a single pass process and manufacturing equipment expense is also reduced. The simplicity of this system makes it easy to implement into the manufacturing environment. Additionally, use of the self-servowrite process is more desirable as it is run outside of the clean room and uses less expensive factory space.

Figure 5:
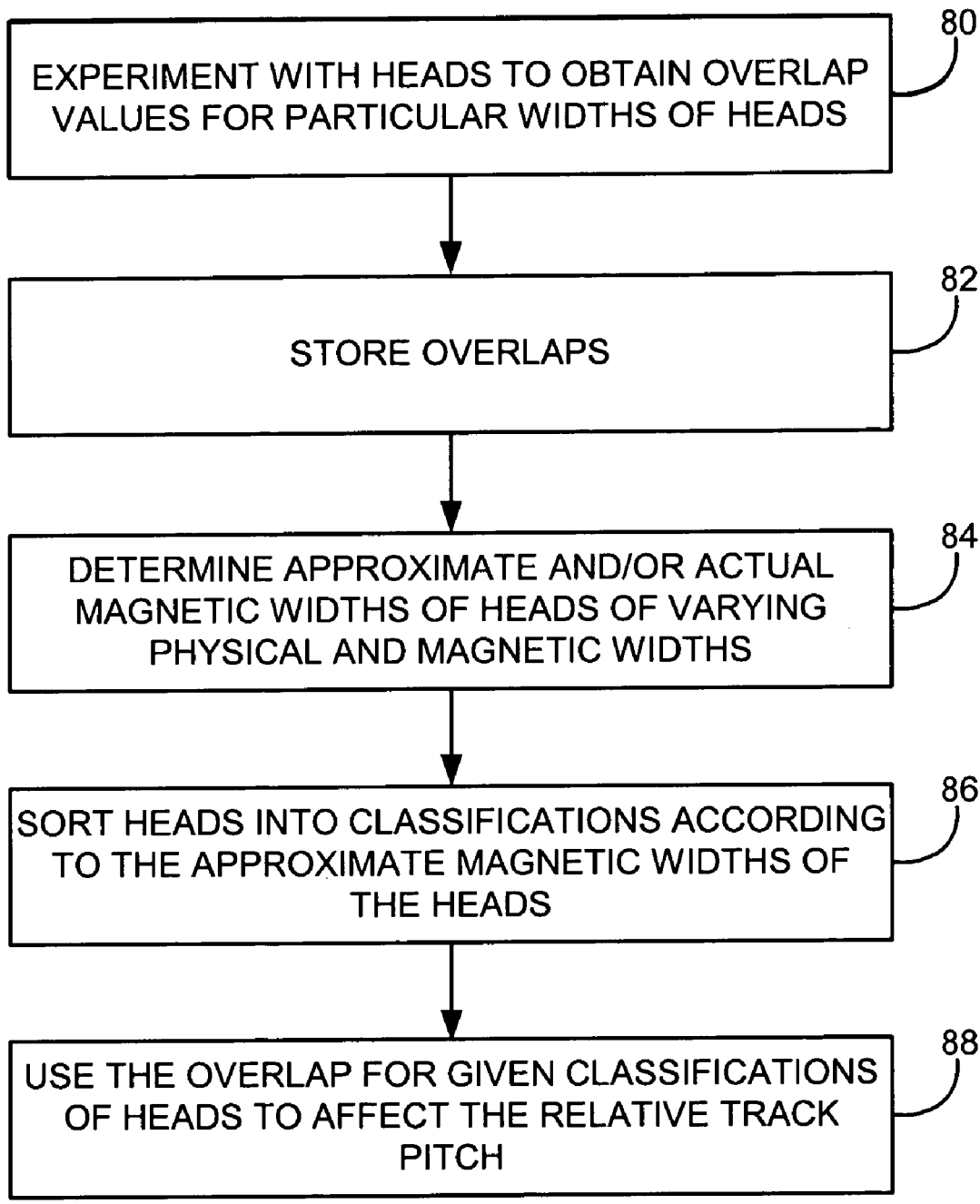
FIG. 5 is a flow diagram illustrating a method for calculating average estimated overlaps for different sizes of heads.

In FIG. 5, there is shown a flow diagram illustrating a method for calculating and assigning estimated overlaps for different sizes of heads, according to one embodiment. These overlaps can then be used to affect the track pitch and thus the number of written tracks.

At block 80, experiments are performed with many heads of differing magnetic widths to obtain a desired track count. In a typical run, the magnetic width of a head is measured. Various track pitches are applied until the desired track count is obtained. Then, the track overlap is calculated for that particular width of head.

Figure 6:
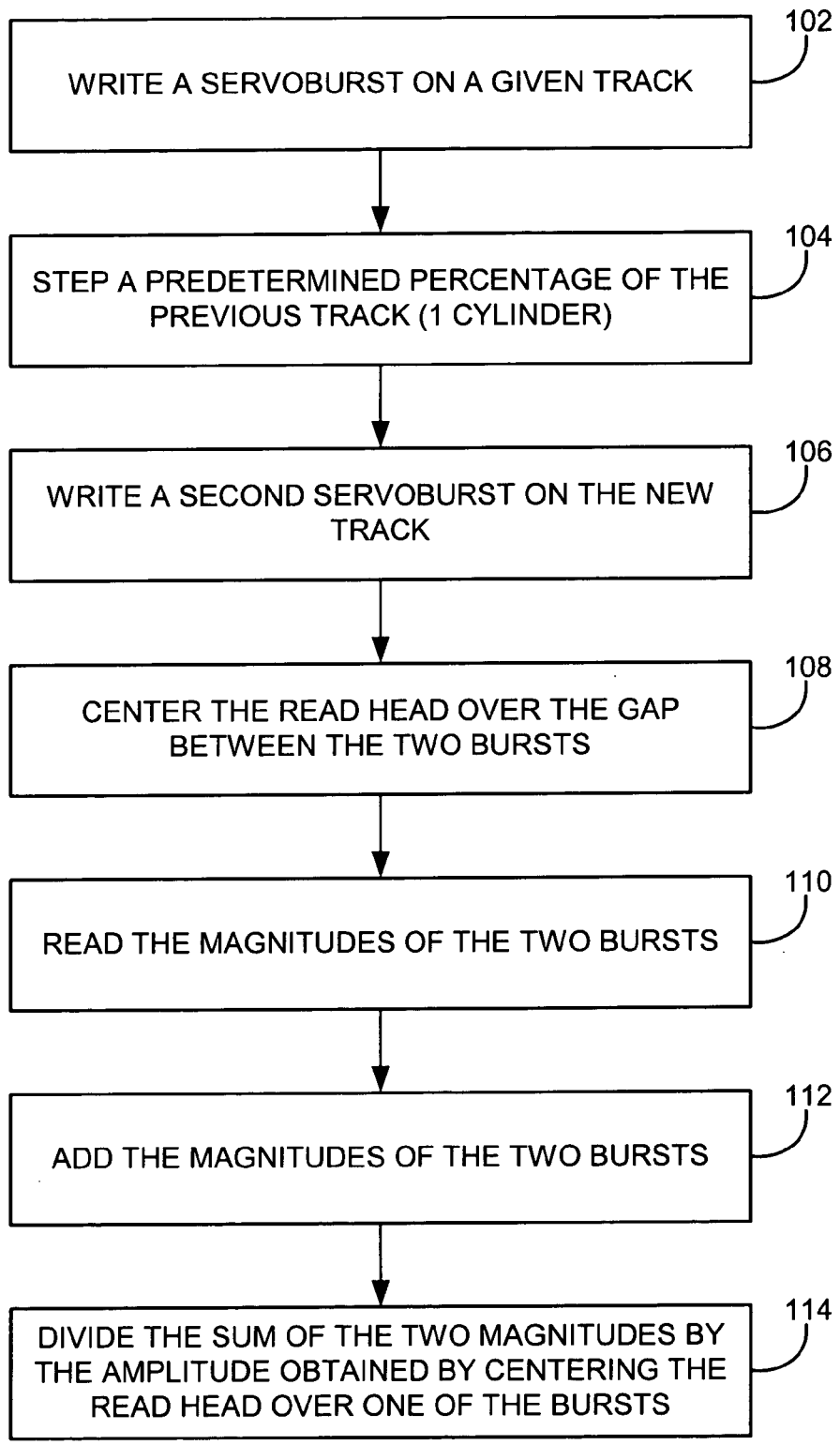
FIG. 6 illustrates a flow chart of an illustrative process for determining the overlap for a particular classification of heads.

FIG. 6 illustrates a flow chart of an illustrative process for determining the overlap of a head allowing it to be classified. At block 102, a servoburst is written on a given track. At block 104, the test head steps forward a predetermined percentage of the previous track (approximately one cylinder). In this example, the head steps two servo tracks (1 cylinder). At block 106, a second servoburst is written on the new track. At block 108, the read head is centered over the gap between the two bursts. The magnitudes of the two bursts are read at block 110, and added together at block 112. The sum of the two magnitudes is divided by the amplitude obtained by centering the read head over one of the bursts. Note block 114. The result is the overlap.

Figure 7:
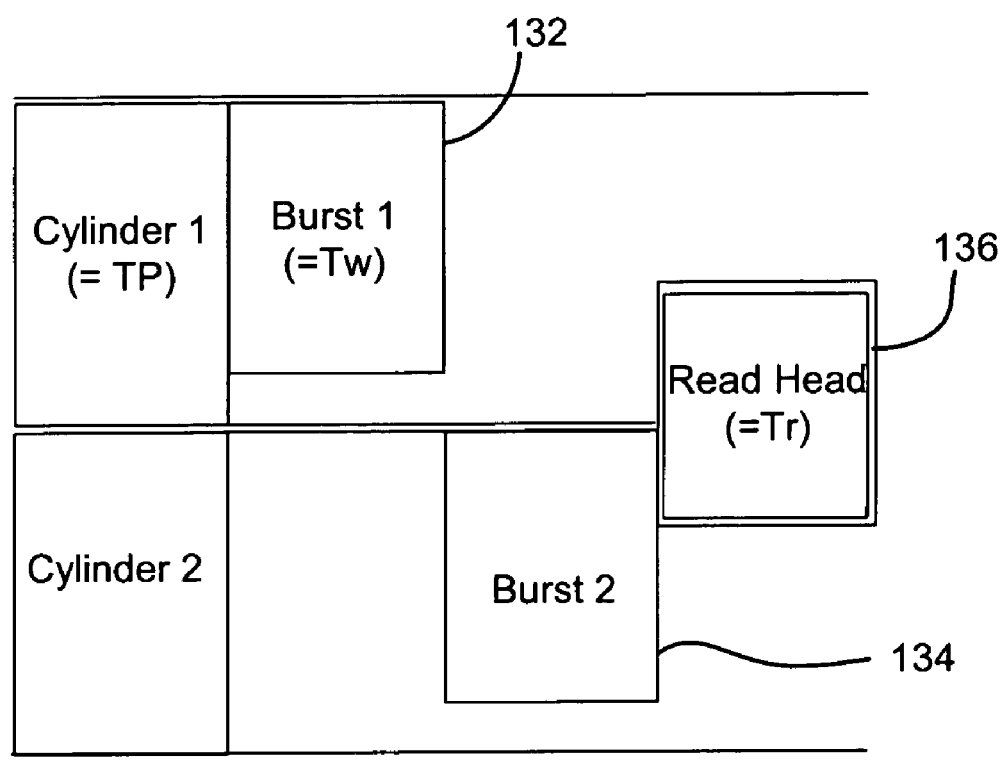
FIG. 7 graphically illustrates an exemplary run of the process of FIG. 6.

Equation 1 may also be used to calculate the overlap.

$$OL=((Tr/TP+Tw/TP)-1)/(Tr/TP)$$ Equation 1 where:
OL=overlap
Tr=amplitude obtained by the read head
Tw=amplitude of one of the bursts
TP=total amplitude of a cylinder FIG. 7 graphically illustrates an exemplary run of the process of FIG. 6. As shown, a first servoburst 132 is written on a given track. A second servoburst 134 is written on a second cylinder. The read head 136 is centered over the gap between the two bursts. In this example, assume the following data:

Burst 1 amplitude=2
Burst 2 amplitude=2
Amplitude sum=4
Full burst amplitude=5
Overlap=4/5=0.8

Or using the equation:

$$OL=((5/7+6/7)-1)/(5/7)$$

$$=((5+6)-7)/(5)$$

$$=(11-7)/5$$

$$=4/5$$

$$=0.8$$

With continued reference to FIG. 5, at block 82, the overlaps calculated as above for a given classification of heads (e.g., narrow, nominal, wide) are stored in a table or are otherwise recorded. One such table is shown below. In this example, overlaps for drive configurations with one and two heads are stored for each of the three illustrative width classifications.

TABLE 1

Example Self-Servowrite Overlaps

|  | Narrow | Nominal | Wide |
| --- | --- | --- | --- |
| One head | 0.84 | 0.90 | 0.93 |
| Two heads | 0.84 | 0.90 | 0.96 |

Now that the overlap for given classifications of heads have been calculated, they can be used to affect the track pitch for a particular drive using heads of a particular classification, and thus the number of written tracks in the drive. Note block 90. This allows placement of a consistent number of tracks on all heads, and thus a consistent capacity. For example, if the magnetic widths of the heads are wider than normal, the tracks can be pushed closer together. Likewise, if the magnetic widths of the heads are more narrow than normal, the tracks can be pushed farther apart.

Prior to beginning manufacture of the storage systems, at block 84, the approximate and/or actual magnetic widths of heads of varying physical and magnetic widths are determined, such as from the manufacturing measurements of the recording heads. For example, the widths can be determined from samples and/or from 100% magnetic testing. In the case where only sampled magnetic data is available, the approximate magnetic width from the wafer or wafer segment information can be utilized. Thus, the approximate mechanical and magnetic widths of individual wafers or wafer segments can be known in advance of assembly of the storage system.

At block 86, the heads are sorted or "binned" according to the approximate magnetic widths of the heads. Illustrative classifications for the head magnetic widths are narrow, nominal and wide. For example, classification of a head as narrow, nominal and wide may be determined from an average measurement(s) of an area on the wafer from which the heads were taken. Also note that all heads from the entire wafer can be classified as narrow, nominal, and wide.

A self-servowritten overlap is assigned to each classification based on an average or actual width of the heads in that classification. More particularly, a preferred overlap is selected for each drive (based on the average expected width of the heads in the drive) which gives the best probability of writing the correct number of tracks. The servowrite process moves at a relative track to track spacing to give the correct overlap. It adjusts the relative movement from one track to the next on the fly to maintain the desired overlap. Note block 88.

Figure 8:
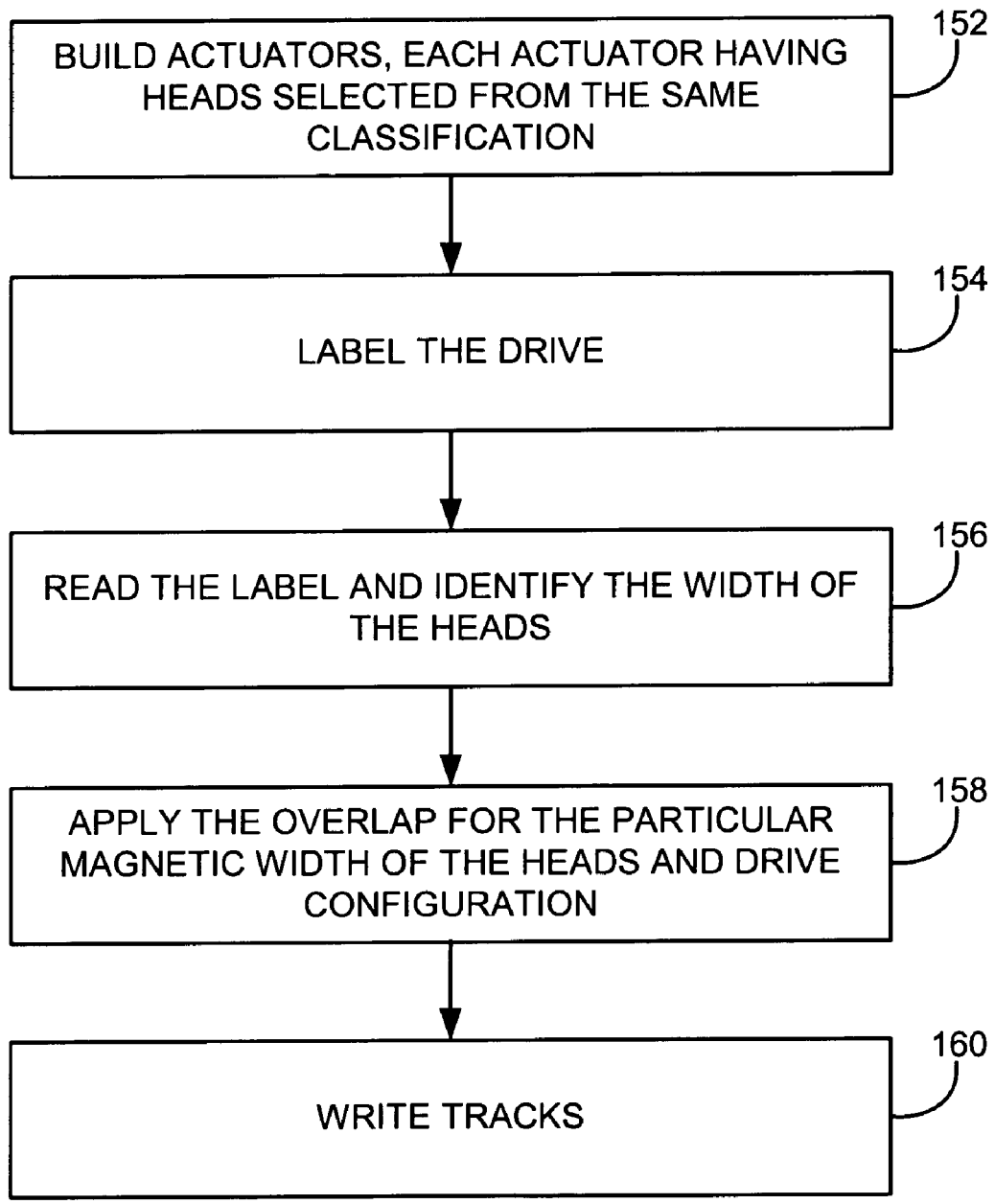
FIG. 8 depicts a flow diagram illustrating a method for creating a hard drive system capable of self-servowriting in one pass.

In FIG. 8, there is shown a flow diagram illustrating a method for creating a hard drive system capable of self-servowriting in one pass, according to a preferred embodiment. At block 152, the number of actuators necessary to make the drive system are built, each actuator having heads selected from the same "bin" or classification (e.g., narrow, nominal, or wide). At block 154, the drive is electronically labeled. A visible label can also be attached to the drive housing. The label indicates the classification of the heads installed in the drive. At block 156, the servowriter reads the label and identifies the width of the heads and/or number of heads from the label. At block 158, the overlap for the particular magnetic width of the heads is applied, and tracks are written based on the overlap at block 160. The overlap allows the correct number of tracks to be written on the first pass. Further, this process of classifying the heads by width and calculating an overlap for each head classification results in a tighter distribution of actual track count and more closely approximates the results obtained from a pusher servowriter.

Figure 9:
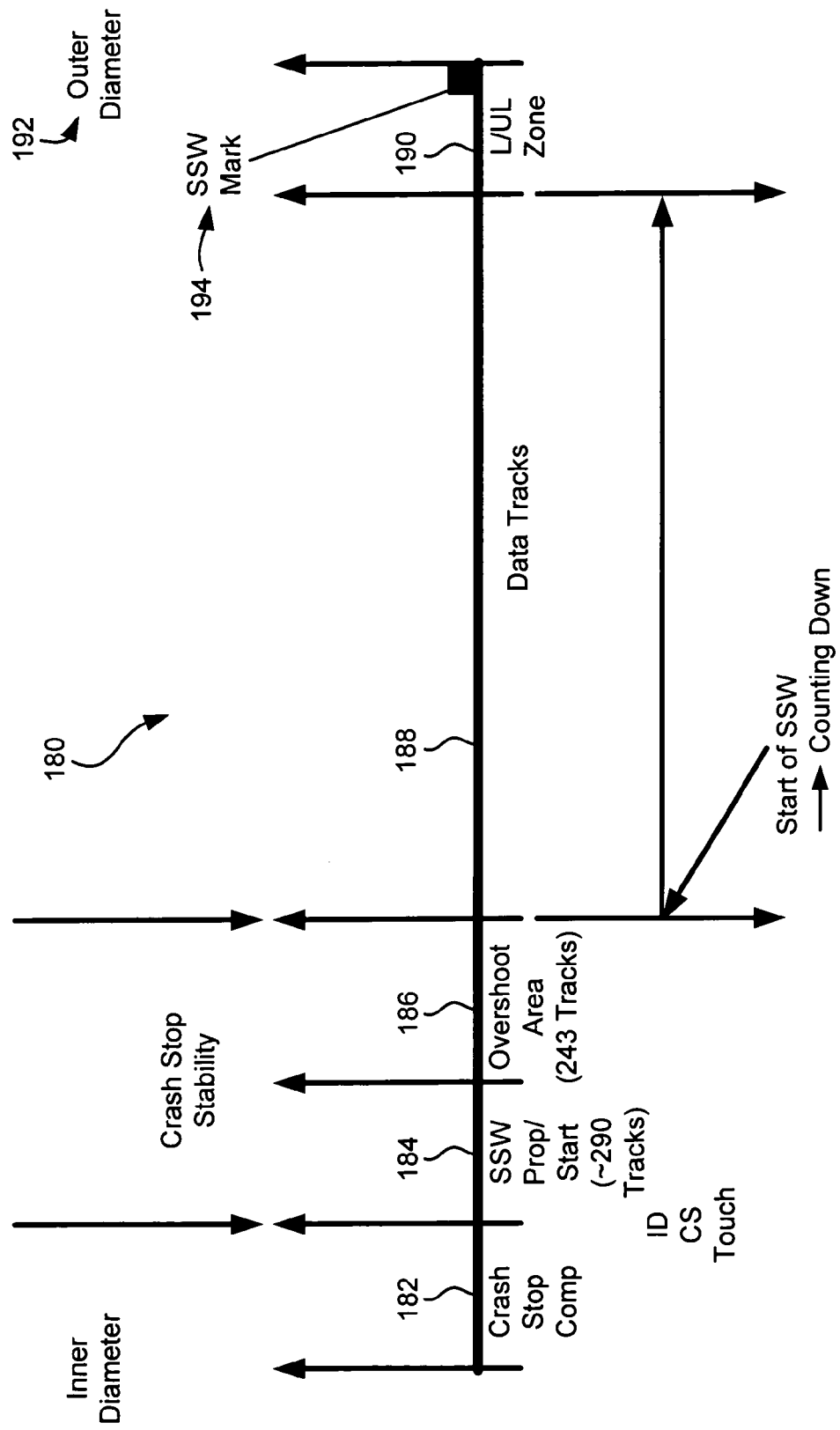
FIG. 9 is a representation of a cross section of a magnetic disk media, indicating areas written to during a one pass self-servowrite process.

FIG. 9 is a representation of a cross section of a magnetic disk media 180, indicating areas written to during a one pass self-servowrite process according to one embodiment. Note that the values shown are given by way of example only and show one possible implementation. The process begins by moving the head to the inner crash stop, which has some compression capabilities. The head is moved against the inner crash stop, which is used as a spring to push the head into the crash stop compensation area 182. A few tracks are written in the crash stop compensation area 182 to both clock the disk and position the head. Propagation tracks are written in the self-servowrite propagation/start area 184 to stabilize the head. During this period, the processes shown in FIGS. 6 and 7 and/or Equation 1 are preferably used to fine-tune the servowrite process so that it uses the desired overlap during servowriting. Note that a few tracks may be written before stabilization is achieved.

The head is then moved out of the propagation/start area 184 and tracks are written across the overshoot area 186, data area 188, and load/unload area 190 of the disk 180. During writing, the head steps across these areas 186, 188, 190, always moving a percentage of the previous written track and writing one, two, or more servo bursts per data track. When the head is near the outer diameter 192, a mark (20–30 tracks) 194 indicating the number of tracks is written to the disk.

As an option, the manufacturing system can be modified to transparently test and evaluate the drives having heads of differing magnetic widths to achieve the correct number of tracks for the desired format.

When loading the disk, the drive is spun up and the mark 194 is read. Because the track count is now known, it can be used to determine which if any additional formats should be used to get the correct capacity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for constructing a magnetic storage drive capable of single pass self-servowriting, comprising:
    sorting a plurality of heads into classifications based on at least an approximate magnetic width of each head;
    installing only heads from a single classification in a particular disk drive system;
    writing two servobursts on a disk in the disk drive system using one of the heads;
    calculating a tack overlap value for the approximate magnetic widths of the one of the heads in the single classification based on magnitudes of the two servobursts by dividing a sum of the servoburst magnitudes by an amplitude obtained by centering the read head over one of the servobursts and taking a reading; and
    using the overlap value to determine a track spacing utilized during a self-servowriting process.

2. A method as recited in claim 1, further comprising using the track overlap values to affect the track pitches applied to the drive system.

3. A method as recited in claim 1, wherein the approximate magnetic widths of the heads are determined by testing the heads.

4. A method as recited in claim 1, wherein the approximate magnetic widths of the heads are determined from measurements of a wafer on which the heads have been formed.

5. A method for constructing a magnetic storage drive, comprising:
    sorting a plurality of heads into classifications based on at least an approximate magnetic width of each head;
    installing only heads from a single classification in a particular disk drive system;
    calculating a track overlap value for the approximate magnetic widths of the heads in the single classification; and
    using the overlap value to determine a track spacing utilized during a self-servowriting process;
    wherein the overlap value is determined from an equation:

$OL=((Tr/TP+Tw/TP)-1)/(Tr/TP)$ where:
    OL=overlap value;
    Tr=amplitude obtained by a read head;
    Tw=amplitude of one of a bursts; and
    TP=total amplitude of a cylinder.

6. A method for constructing a magnetic storage drive, comprising:
    sorting a plurality of heads into classifications based on at least an approximate magnetic width of each head;
    installing only heads from a single classification in a particular disk drive system;
    calculating a track overlap value for the approximate magnetic widths of the heads in the single classification; and
    using the overlap value to determine a track spacing utilized during a self-servowriting process;
    wherein the overlap value is determined by:
    writing a servoburst on a given track of a disk;
    writing a second servoburst on a second track of the disk;
    centering a read head over a gap between the two servobursts;
    reading magnitudes of the two servobursts using the read head;
    adding the magnitudes of the two servobursts; and dividing a sum of the servoburst magnitudes by an amplitude obtained by centering the read head over one of the servo bursts and taking a reading.

7. A method for selecting desired average estimated overlaps for different sizes of heads, comprising:
   determining at least an approximate magnetic width of at least some of a plurality of heads;
   sorting the heads into classifications based on the magnetic widths; and
   selecting a track overlap value for each classification based on the approximate magnetic widths of the heads in each classification and the resultant track counts obtained after the self-servowrite process is completed, the track overlap value corresponding to a calculation for representative heads in the classification based on magnitudes of two servobursts created by the representative heads, wherein the overlap value is calculated by dividing a sum of the servoburst magnitudes by an amplitude obtained by centering the read head over one of the servobursts and taking a reading.

8. A method as recited in claim 7, further comprising using the track overlap values to affect the track pitches applied to drives using heads from a particular classification.

9. A method as recited in claim 7, wherein the approximate magnetic widths of the heads are determined by testing the heads.

10. A method as recited in claim 7, wherein the approximate magnetic widths of the heads are determined from measurements of a wafer on which the heads have been formed.

11. A method for selecting desired average estimated overlaps for different sizes of heads, comprising:
    determining at least an approximate magnetic width of at least some of a plurality of heads;
    sorting the heads into classifications based on the magnetic widths; and
    selecting a track overlap value for each classification based on the approximate magnetic widths of the heads in each classification and the resultant track counts obtained after the self-servowrite process is completed;
    wherein the overlap value has been determined empirically from an equation:

$$OL=((Tr/TP+Tw/TP)-1)/(Tr/TP)$$

where:
OL=overlap value;
Tr=amplitude obtained by a read head;
Tw=amplitude of one of a bursts; and
TP=total amplitude of a cylinder.

12. A method for selecting desired average estimated overlaps for different sizes of heads, comprising:
    determining at least an approximate magnetic width of at least some of a plurality of heads;
    sorting the heads into classifications based on the magnetic widths; and
    selecting a track overlap value for each classification based on the approximate magnetic widths of the heads in each classification and the resultant track counts obtained after the self-servowrite process is completed;
    wherein the overlap value has been determined empirically by:
    writing a servoburst on a given track of a disk;
    writing a second servoburst on a second track of the disk;
    centering a read head over a gap between the two servobursts;
    reading magnitudes of the two servobursts using the read head;
    adding the magnitudes of the two servobursts;
    dividing a sum of the servoburst magnitudes by an amplitude obtained by centering the read head over one of the servobursts and taking a reading.

13. A magnetic storage system capable of single pass self-servowriting, comprising:
    magnetic media;
    at least one head for reading from and writing to the magnetic media, wherein each head has been sorted into a classification based on at least an approximate magnetic width of each head, wherein a track overlap value for the classification has been selected based on the approximate magnetic width of each head in the classification, the overlap value having been determined empirically based on a magnitude of at least two servobursts created by a representative head in the classification, wherein the overlap value is used to determine a track spacing during a self-servowriting process, wherein the overlap value is calculated by dividing a sum of the servoburst magnitudes by an amplitude obtained by centering the read head over one of the servobursts and taking a reading;
    a slider for supporting each head; and
    a control unit coupled to each head for controlling operation of each head.

14. A system as recited in claim 13, wherein the overlap value is determined from an equation:

$$OL=((Tr/TP+Tw/TP)-1)/(Tr/TP)$$

where:
OL=overlap value;
Tr=amplitude obtained by a read head;
Tw=amplitude of one of a bursts; and
TP=total amplitude of a cylinder.

15. A system as recited in claim 13, wherein the approximate magnetic widths of the heads are determined by testing the heads.

16. A system as recited in claim 13, wherein the approximate magnetic widths of the heads are determined from measurements of a wafer on which the heads have been formed.

17. A system capable of single pass self-servowriting, comprising:
    magnetic media;
    at least one head for reading from and writing to the magnetic media, wherein each head has been sorted into a classification based on at least an approximate magnetic width of each head, wherein a track overlap value for the classification has been selected based on the approximate magnetic width of each head in the classification, wherein the overlap value is used to determine a track spacing during a self-servowriting process;
    a slider for supporting each head; and
    a control unit coupled to each bead for controlling operation of each head;
    wherein the overlap value is determined by:
    writing a servoburst on a given track of a disk;
    writing a second servoburst on a second track of the disk;
    centering a read head over a gap between the two servobursts;
    reading magnitudes of the two servobursts using the read head;
    adding the magnitudes of the two servobursts;
    dividing a sum of the servoburst magnitudes by an amplitude obtained by centering the read head over one of the servobursts and taking a reading.

* * * * *

UNITED STATES PATENT AND TRADEMARK OFFICE
CERTIFICATE OF CORRECTION

PATENT NO. : 7,023,633 B2  
APPLICATION NO. : 10/355474  
DATED : April 4, 2006  
INVENTOR(S) : Malone, Sr.

Page 1 of 1

It is certified that error appears in the above-identified patent and that said Letters Patent is hereby corrected as shown below:

col. 8, line 10 change "tack" to --track--;  
col. 10, line 52 change "bead" to --head--.

Signed and Sealed this

Twenty-second Day of August, 2006

JON W. DUDAS  
*Director of the United States Patent and Trademark Office*